(12) United States Patent
Naito (10) Patent No.: US 9,540,788 B2
(45) Date of Patent: Jan. 10, 2017

(54) WORK VEHICLE

(71) Applicant: KOMATSU LTD., Tokyo (JP)

(72) Inventor: Makoto Naito, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/903,604

(22) PCT Filed: Jun. 18, 2014

(86) PCT No.: PCT/JP2014/066176
§ 371 (c)(1),
(2) Date: Jan. 8, 2016

(87) PCT Pub. No.: WO2015/019719
PCT Pub. Date: Feb. 12, 2015

(65) Prior Publication Data
US 2016/0153172 A1    Jun. 2, 2016

(30) Foreign Application Priority Data

Aug. 9, 2013 (JP) ................................. 2013-166206

(51) Int. Cl.
*B60K 6/20* (2007.10)
*E02F 9/08* (2006.01)
(Continued)

(52) U.S. Cl.
CPC .............. *E02F 9/0858* (2013.01); *B60K 1/00* (2013.01); *B60K 6/22* (2013.01); *B60L 11/14* (2013.01);
(Continued)

(58) Field of Classification Search
CPC .............. B60K 6/22; B60K 1/04; B60K 1/00; B60K 6/20
See application file for complete search history.

(56) References Cited

U.S. PATENT DOCUMENTS 7,025,160 B2 * 4/2006 Awakawa ................ B60K 1/04
                                                                180/68.5
7,802,643 B2 * 9/2010 Yajima .................... B60K 6/22
                                                                180/271
(Continued)

FOREIGN PATENT DOCUMENTS

CN    101152835 A    4/2008
CN    102470742 A    5/2012
(Continued)

OTHER PUBLICATIONS

The Office Action for the corresponding Chinese application No. 201480041212.2, issued on Jun. 6, 2016.
(Continued)

*Primary Examiner* — Hau Phan
(74) *Attorney, Agent, or Firm* — Global IP Counselors, LLP (57) ABSTRACT

A work vehicle includes a vehicle body frame, an inverter, and first through fourth brackets. The first bracket extends in the vehicle width direction, and is disposed in front of the inverter. Both ends of the first bracket are supported by the vehicle body frame. The second bracket is fixed to the left part of the inverter, and extends in the vertical direction. The second bracket is fixed to the first bracket. The third bracket is fixed to the right part of the inverter, and extends in the vertical direction. The third bracket is fixed to the first bracket. The fourth bracket is fixed to at least one of the second and third brackets, extends in the longitudinal direction of the vehicle away from the first bracket, and is supported by the vehicle body frame. The shortest sides of the inverter extend in the longitudinal direction of the vehicle.

14 Claims, 7 Drawing Sheets

(51) Int. Cl.
*B60K 1/00* (2006.01)
*B60K 6/22* (2007.10)
*B60L 11/14* (2006.01)
*B60L 11/18* (2006.01)
*E02F 3/28* (2006.01)
*E02F 3/34* (2006.01)

(52) U.S. Cl.
CPC ............. *B60L 11/18* (2013.01); *E02F 3/283* (2013.01); *B60Y 2200/415* (2013.01); *B60Y 2200/92* (2013.01); *B60Y 2400/61* (2013.01); *E02F 3/3411* (2013.01); *Y10S 903/903* (2013.01)

(56) References Cited

U.S. PATENT DOCUMENTS

| | | | | |
|---|---|---|---|---|
| 7,913,439 | B2* | 3/2011 | Whaley | F41G 11/003 362/110 |
| 8,596,397 | B2* | 12/2013 | Sakamoto | H05K 5/0204 180/68.5 |
| 2004/0079569 | A1 | 4/2004 | Awakawa | |
| 2009/0199553 | A1 | 8/2009 | Nishimura et al. | |
| 2010/0188814 | A1* | 7/2010 | Nakatsu | H02M 7/003 361/689 |
| 2010/0297926 | A1 | 11/2010 | Shimomura et al. | |
| 2011/0170259 | A1* | 7/2011 | Miller | H05K 7/20927 361/689 |
| 2012/0118653 | A1 | 5/2012 | Ogihara et al. | |
| 2012/0129440 | A1 | 5/2012 | Kitaguchi et al. | |
| 2012/0170217 | A1* | 7/2012 | Nishikimi | H05K 7/20927 361/689 |
| 2013/0037335 | A1 | 2/2013 | Sakamoto | |
| 2013/0075171 | A1 | 3/2013 | Noguchi et al. | |
| 2013/0134775 | A1 | 5/2013 | Tomokage et al. | |

FOREIGN PATENT DOCUMENTS

| | | |
|---|---|---|
| CN | 102951006 A | 3/2013 |
| CN | 103101421 A | 5/2013 |
| EP | 2 053 167 A1 | 4/2009 |
| EP | 2 256 256 A2 | 12/2010 |
| EP | 2 584 100 A1 | 4/2013 |
| JP | 2002-227241 A | 8/2002 |
| JP | 2004-168149 A | 6/2004 |
| JP | 2008-39206 A | 2/2008 |
| JP | 2012-112102 A | 11/2010 |
| JP | 2012-41819 A | 3/2012 |

OTHER PUBLICATIONS

The extended European search report for the corresponding international application No. 14835136.4, issued on Jun. 16, 2016.
International Search Report for the corresponding international application No. PCT/JP2014/066176, issued on Aug. 5, 2014.

* cited by examiner

WORK VEHICLE

CROSS-REFERENCE TO RELATED APPLICATIONS

This application is a U.S. National stage application of International Application No. PCT/JP2014/066176, filed on Jun. 18, 2014. This U.S. National stage application claims priority under 35 U.S.C. §119(a) to Japanese Patent Application No. 2013-166206, filed in Japan on Aug. 9, 2013, the entire contents of which are hereby incorporated herein by reference.

BACKGROUND

Field of the Invention

The present invention relates to a hybrid work vehicle in which driving force is generated both by a diesel engine and by an electric motor.

Background Information

In recent years, hybrid work vehicles are being developed in which driving force is generated both by a diesel engine and by an electric motor (refer to Japanese Laid-Open Patent Publication 2012-041819).

SUMMARY

In Japanese Laid-Open Patent Publication 2012-041819, a hydraulic shovel is disclosed as an example of a hybrid work vehicle. The vacant space within an engine compartment of this hydraulic shovel is large. Accordingly, it is possible to mount an inverter for driving the electric motor and so on in a simple and easy manner.

However, with a wheel loader or a motor grader, only a small amount of vacant space is available within an engine compartment. Moreover, it is difficult to enlarge the engine compartment in a wheel loader or a motor grader, because it exerts an influence upon deterioration of the rearward visibility and so on. Accordingly, efficiently mounting an inverter and so on to a wheel loader or a motor grader or the like is a problem to be solved.

The work vehicle according to one aspect of the present invention is a work vehicle in which driving force is generated by an engine and by an electric motor, comprising a vehicle body frame, an inverter, and first through fourth brackets. The inverter is shaped as a rectangular parallelepiped. The first bracket extends along the vehicle width direction of the work vehicle. The second bracket is fixed to a left part of the inverter and extends vertically. The second bracket is fixed to the first bracket. The third bracket is fixed to a right part of the inverter and extends vertically. The third bracket is fixed to the first bracket. The fourth bracket is fixed to at least one of the second bracket and the third bracket, extends in the longitudinal direction of the vehicle in a direction away from the first bracket, and is supported by the vehicle body frame. The shortest side of the inverter extends along the longitudinal direction of the vehicle.

The first bracket may be an inverted letter-U shaped member made from a pipe material.

The vehicle body frame may include a left member and a right member. When a first distance in the vehicle width direction between the inverter and the left member is longer than a second distance in the vehicle width direction between the inverter and the right member, then the fourth bracket may be positioned on the right side of the inverter; and, when the second distance is longer than the first distance, then the fourth bracket may be positioned on the left side of the inverter.

When the first distance in the vehicle width direction between the inverter and the left member is longer than the second distance in the vehicle width direction between the inverter and the right member, a power cable connecting the inverter and the electric motor may be disposed on the left side of the inverter; and, when the second distance is longer than the first distance, the power cable may be disposed on the right side of the inverter.

The first bracket, the second bracket, and the third bracket may be integrally formed. The fourth bracket is attachable to and detachable from either of the second bracket and the third bracket.

This hybrid work vehicle may further include a first elastic member and a second elastic member. The first elastic member may be connected to a lower left end portion of the first bracket. The second elastic member may be connected to a lower right end portion of the first bracket. A central axis of the first elastic member may coincide with a central axis of the lower left end portion of the first bracket. A central axis of the second elastic member may coincide with a central axis of the lower right end portion of the first bracket. The first bracket may be supported by the vehicle body frame via the first elastic member and the second elastic member.

The third elastic member may be connected to the front end of the fourth bracket. The fourth bracket may be supported by the vehicle body frame via the third elastic member.

There may be further included a capacitor elastically supported by the vehicle body frame below the inverter so that the vibrational system of the capacitor is different from the vibrational system of the inverter.

The inverter and the capacitor may be separated from one another in the vertical direction by a gap.

In a top view, the entirety of the inverter may be overlapped over the capacitor.

With the hybrid work vehicle according to the exemplary embodiment of the present invention described above, the rectangular parallelepiped shaped inverter has its shortest side disposed as extending along the longitudinal direction of the vehicle. Accordingly, to mount the inverter, the longitudinal direction of the vehicle need not be extended greatly. Consequently, it is possible to mount the inverter to the vehicle in an efficient manner. Moreover, although the inverter is mounted in an unstable posture, the second bracket and the third bracket are respectively fixed to a left portion and to a right portion of the inverter. Furthermore, the first bracket and the fourth bracket to which the second bracket and the third bracket are fixed are supported at least at three spots upon the vehicle body frame. Thus, the inverter is arranged in a stable manner.

DESCRIPTION OF EXEMPLARY EMBODIMENTS

Figure 1:
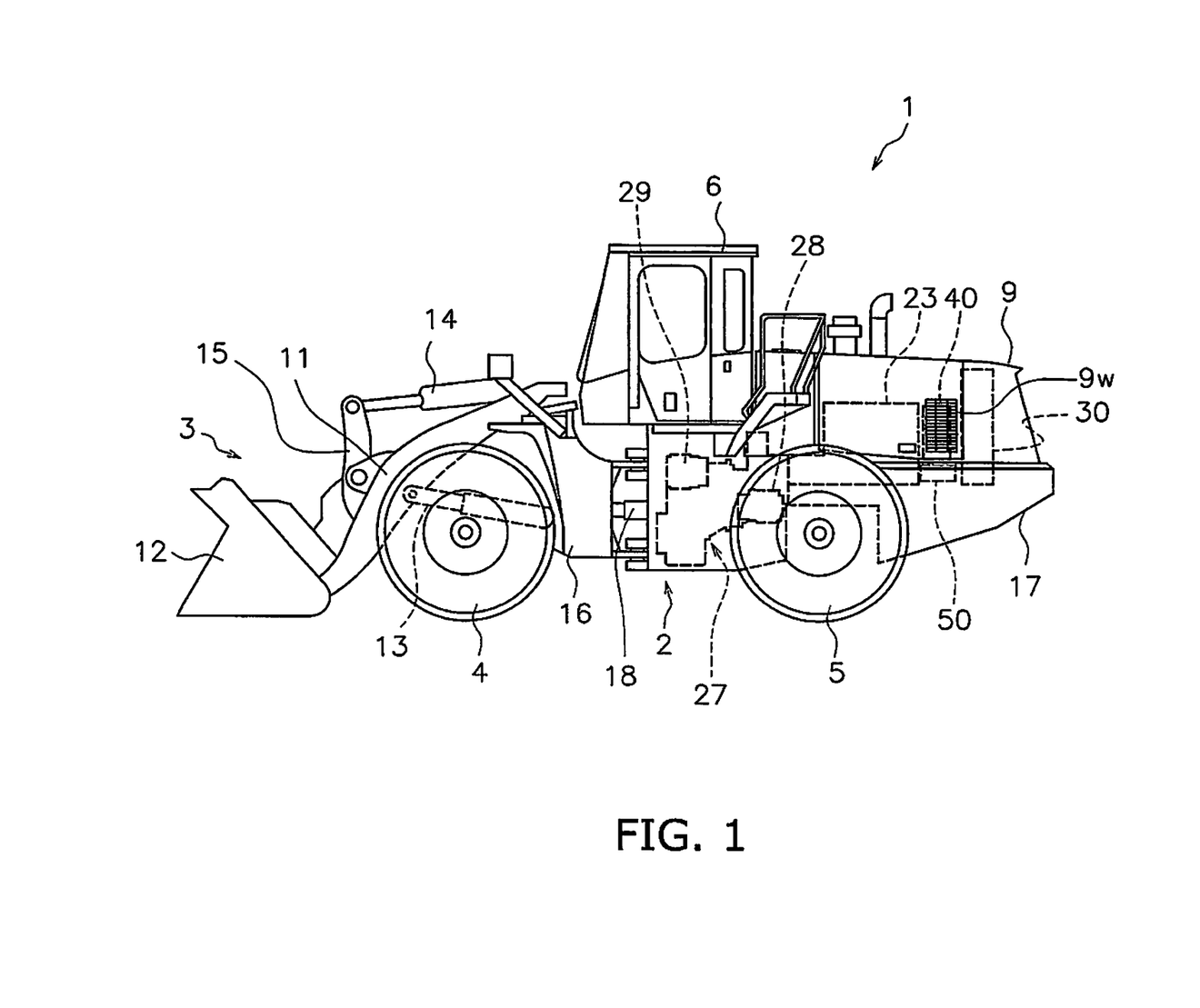
FIG. 1 is a side view of a work vehicle according to an exemplary embodiment of the present invention.

A side view of a work vehicle according to an exemplary embodiment of the present invention is shown in FIG. 1. Desirably, this work vehicle 1 is a wheel loader. It should be understood that, in FIG. 1, the main devices that are mounted within an engine compartment 21 that will be described hereinafter are shown by dotted lines.

Here, in the following explanation, "front" means the front of the vehicle and "rear" means the rear of the vehicle. Moreover, "left" means the leftwards direction of the vehicle when the viewer is facing the front of the vehicle, while "right" means the rightwards direction. Thus, in this exemplary embodiment the "left-right direction" also means the vehicle width direction.

As shown in FIG. 1, the work vehicle 1 comprises a vehicle body frame 2, a working tool 3, propulsion wheels 4 and 5, and a driver compartment 6. The work vehicle 1 is propelled by the propulsion wheels 4 and 5 being rotationally driven. This work vehicle 1 is capable of performing a task, such as excavation or the like, by using the working tool 3.

The working tool 3 and the propulsion wheels 4 and 5 are attached to the vehicle body frame 2. The working tool 3 is driven by operating hydraulic fluid from an operating hydraulic fluid pump not shown in the figures. The working tool 3 includes a boom 11 and a bucket 12. The boom 11 is installed to the vehicle body frame 2. The working tool 3 has a lift cylinder 13 and a bucket cylinder 14. The lift cylinder 13 and the bucket cylinder 14 are hydraulic pressure cylinders. One end of the lift cylinder 13 is attached to the vehicle body frame 2. The other end of the lift cylinder 13 is attached to the boom 11. The boom 11 is pivoted up and down due to the lift cylinder 13 receiving supply of operating hydraulic fluid from the operating hydraulic fluid pump and thereby being extended and retracted. The bucket 12 is attached at the end of the boom 11. One end of the bucket cylinder 14 is attached to the vehicle body frame 2. The other end of the bucket cylinder 14 is attached to the bucket 12 via a crank 15. The bucket 12 is pivoted up and down due to the bucket cylinder 14 receiving supply of operating hydraulic fluid from the operating hydraulic fluid pump and thereby being extended and retracted.

The driver compartment 6 and the propulsion wheels 4 and 5 are attached to the vehicle body frame 2. The driver compartment 6 is mounted upon the vehicle body frame 2. A seat upon which the operator sits and operation devices and so on are disposed within the driver compartment 6. The vehicle body frame 2 includes a front frame 16 and a rear frame 17. The front frame 16 and the rear frame 17 are attached together to be capable of pivoting left and right with respect to one another.

The work vehicle 1 also comprises a steering cylinder 18. This steering cylinder 18 is attached both to the front frame 16 and to the rear frame 17. Here, the region that is supported by the front frame 16 will be termed the "front vehicle body portion", while the region that is supported by the rear frame 17 will be termed the "rear vehicle body portion". The steering cylinder 18 is a hydraulic pressure cylinder. Due to this steering cylinder 18 being extended and retracted by operating hydraulic fluid supplied from a steering pump 30 not shown in the figures, the progression direction of the work vehicle 1 can be changed to the left and to the right.

Internal Structures of the Engine Compartment and the Cooling Compartment

Figure 2:
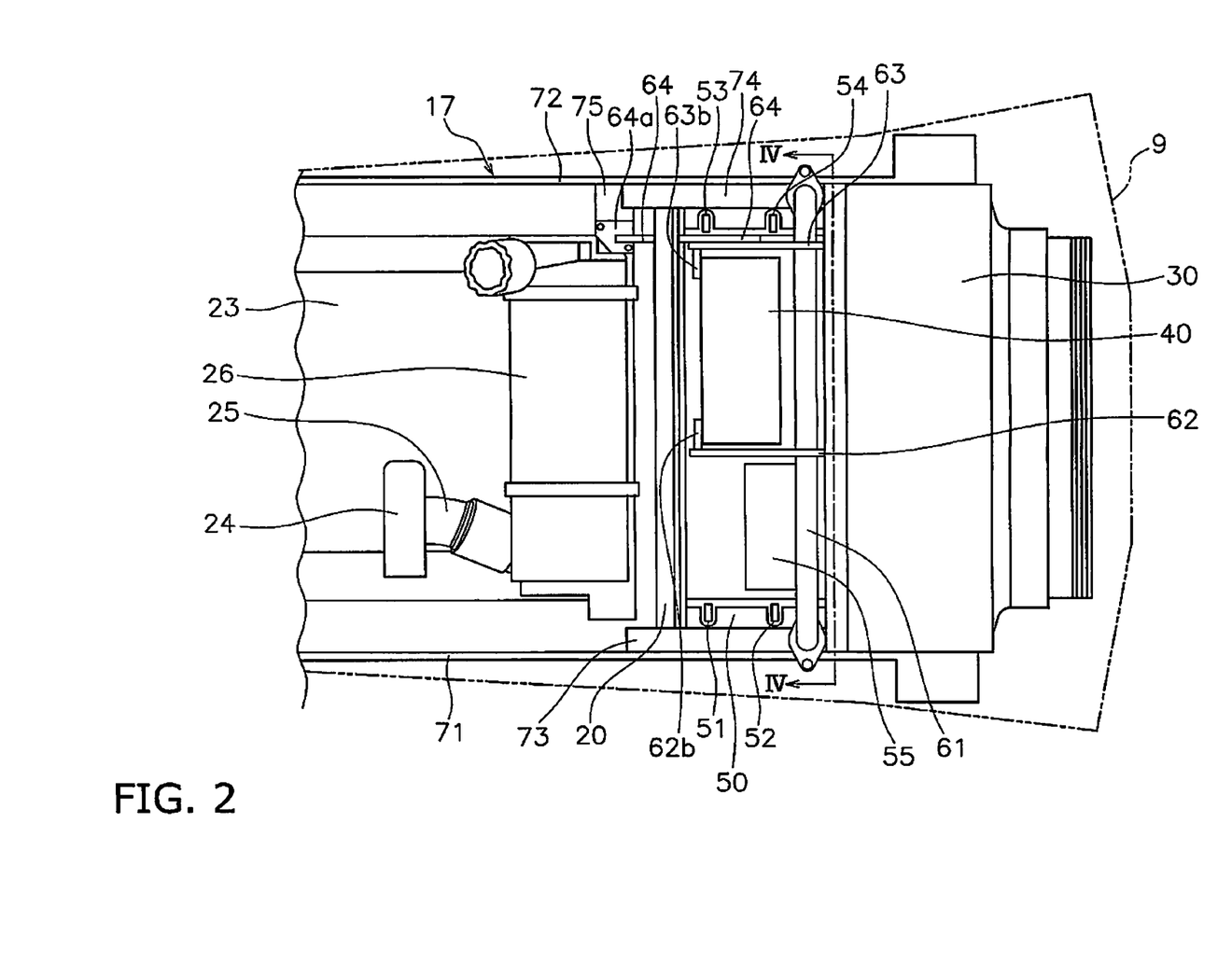
FIG. 2 is a figure showing a portion of the upper surface of the work vehicle of FIG. 1 in a state with an outer cover removed.
Figure 3:
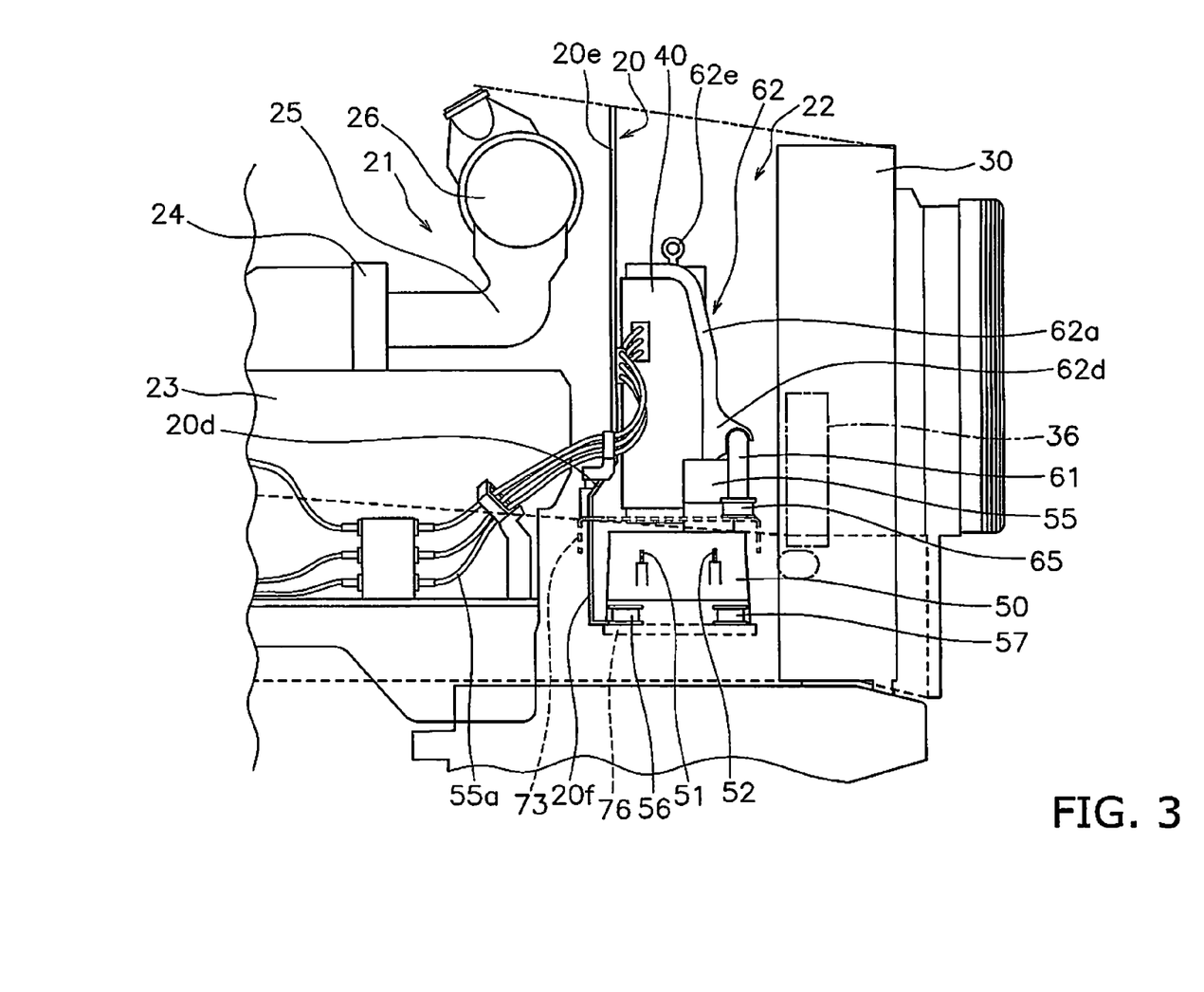
FIG. 3 is a figure showing the left side of the work vehicle of FIG. 1 with the outer cover removed.

FIG. 2 is a figure showing a top view of the rear vehicle body portion with an outer cover 9 (refer to FIG. 1) at the rear of the driver compartment 6 removed. In FIG. 2, the external shape of the outer cover 9 is shown by a double dotted broken line. FIG. 3 is a figure showing the rear vehicle body portion in a left side view, with the outer cover 9 (refer to FIG. 1) at the rear of the driver compartment 6 removed. In FIG. 2 and FIG. 3, the part of the rear vehicle body portion that is more towards the front than the front half of an engine 23 is not shown. For convenience of explanation, the external shape of the rear frame 17 is shown by a dotted line in FIG. 3, and only components that are located within the rear frame 17 are shown fully.

As shown in FIG. 2, the rear frame 17 includes a left member 71 and a right member 72, both of which extend along the longitudinal direction of the vehicle. The left member 71 includes a left inverter support portion 73 and a left capacitor support portion 76 (refer to FIG. 3 etc.) which project inward (i.e. toward the right side) from the inner side surface of the left member 71 (i.e., of the rear frame 17 or the vehicle body frame 2). The right member 72 includes a right inverter support portion 74, a front inverter support portion 75 (refer to FIG. 4 etc.), and a right capacitor support portion 77 (refer to FIG. 4 etc.) which project inward (i.e., toward the left side) from the inner side surface of the right member 72 (i.e., of the rear frame 17 or the vehicle body frame 2). The left member 71 and the right member 72 are almost mutually symmetric, except for the fact that the right member 72 includes the front inverter support portion 75. In the description of this exemplary embodiment, the left inverter support portion 73, the right inverter support portion 74, and the front inverter support portion 75 will be generically termed "inverter support portions", while the left capacitor support portion 76 and the right capacitor support portion 77 will be generically termed "capacitor support portions". The details of the left inverter support portion 73, of the right inverter support portion 74, of the front inverter support portion 75, of the left capacitor support portion 76, and of the right capacitor support portion 77 will be described hereinafter.

As shown in FIG. 3, the rear vehicle body portion is subdivided by a partition wall 20 into an engine compartment 21 and a cooling compartment 22. In other words, the partition wall 20 separates the cooling compartment 22 from the engine compartment 21. The engine 23, an exhaust processing device 26, a transmission 27 (refer to FIG. 1), electric motors 28 and 29, and so on are disposed in the engine compartment 21. In other words, the engine 23 and the electric motors 28 and 29 are housed inside the engine compartment 21. It should be understood that, while two electric motors are shown in FIG. 1, the number of electric motors could be only one, or could be three or more. The engine 23 is, for example, a diesel engine. The engine 23 and the electric motors 28 and 29 are connected to the transmission 27, and generate driving force for the propulsion wheels 4 and 5. Furthermore, the engine 23 generates driving force for driving the operating hydraulic fluid pump, a steering pump, and so on.

The exhaust processing device 26 is a diesel particle collection filter device (Diesel Particulate Filter: DPF), but it may be some other type of exhaust processing device, such as a selective catalytic reduction device (Selective Catalytic Reduction: SCR), a diesel oxidation catalyst device (Diesel Oxidation Catalyst: DOC), or the like. The exhaust of the engine 23 is sent to the exhaust processing device 26 via a turbocharger 24 and a connection conduit 25. The exhaust processing device 26 reduces the concentration of harmful substances in the exhaust.

A cooling device 30, an inverter 40, a capacitor 50, and so on are disposed within the cooling compartment 22. In other words, the cooling device 30, the inverter 40, and the capacitor 50 are housed inside the cooling compartment 22. The cooling device 30 includes devices for providing cooling for devices of various types in the work vehicle 1, such as a radiator 31 (refer to FIG. 7) and so on. The details of the cooling device 30 will be described hereinafter. When the electric motors 28 and 29 which are in the engine compartment 21 are functioning as generators, the inverter 40 converts the electrical er regenerated by these electric motors 28 and 29 into DC current. When the electric motors 28 and 29, which are in the engine compartment 21, are functioning as motors, the inverter 40 converts electrical power accumulated in the capacitor 50 into AC, and controls the electric motors 28 and 29. The capacitor 50 accumulates electrical power regenerated by the electric motors 28 and 29. As shown in FIG. 2 and FIG. 3, the inverter 40 and the capacitor 50 are disposed between the partition wall 20 and the cooling device 30.

Figure 4:
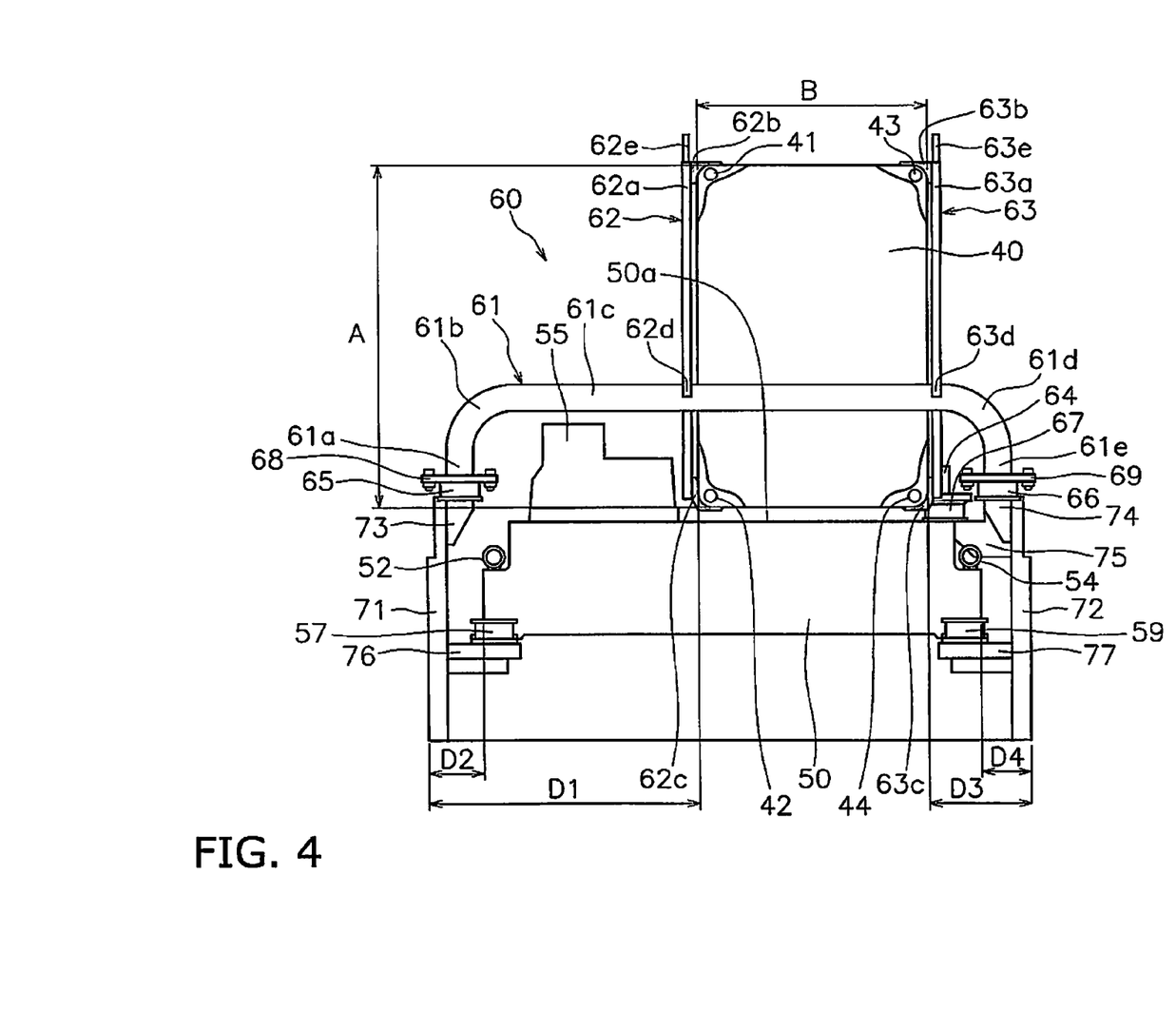
FIG. 4 is a figure showing an inverter, a capacitor, and their support components as seen in a sectional plane shown by the lines IV-IV in FIG. 2.
Figure 5:
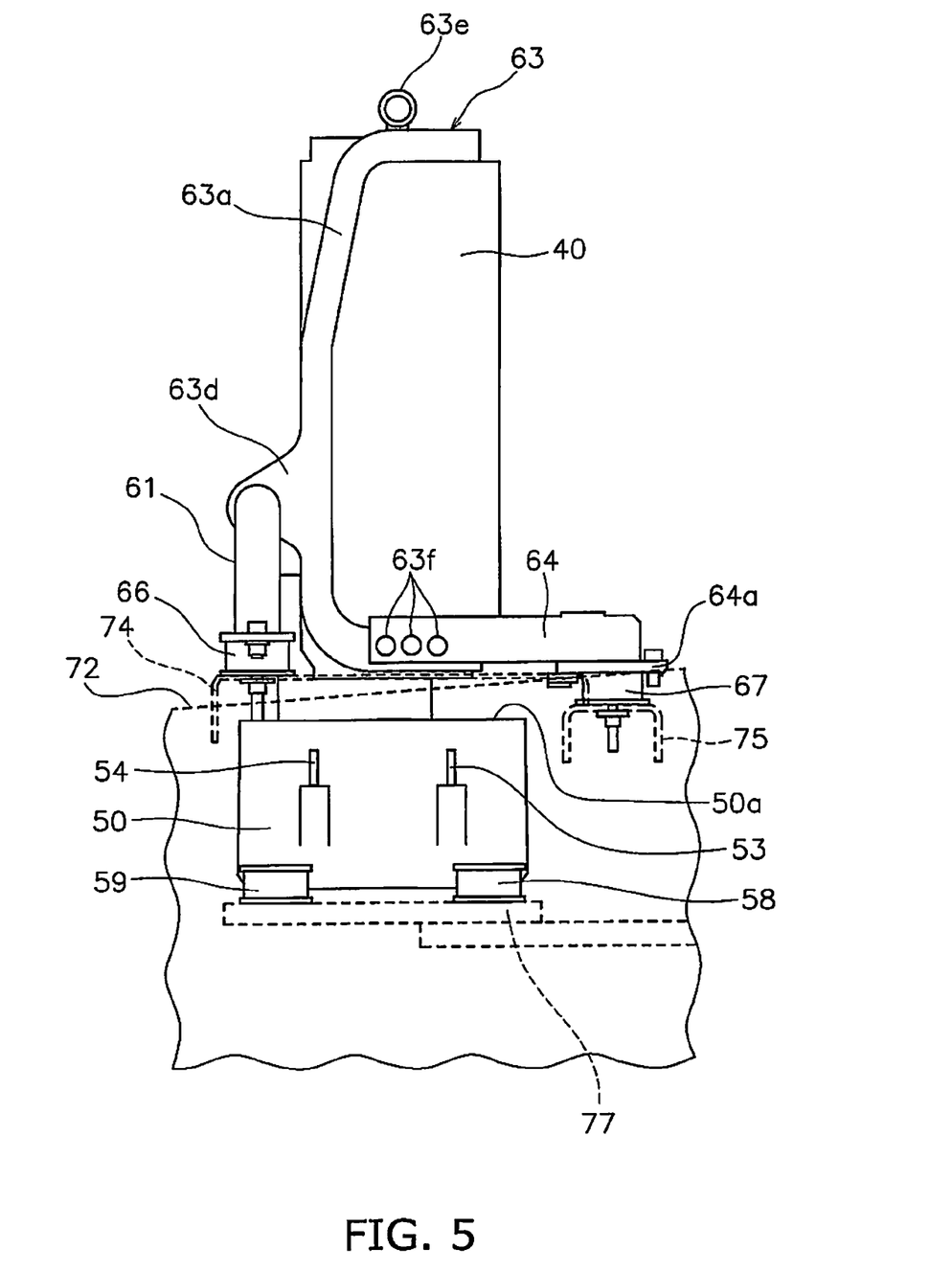
FIG. 5 is a right side view showing a portion of the work vehicle of FIG. 1 with its outer cover removed.

FIG. 4 is a figure showing the inverter 40, the capacitor 50, and their support components as seen in a sectional plane shown by the lines IV-IV in FIG. 2. FIG. 5 is a view showing the surroundings of the inverter 40, the capacitor 50, and their support components in a right side view. In FIG. 5, for the convenience of explanation, the right member 72, the right inverter support portion 74, the front inverter support portion 75, and the right capacitor support portion 77 are shown by dotted lines, and only the components inboard from the right member 72 are shown.

The capacitor 50 is a device having the shape of a rectangular parallelepiped. The capacitor 50 is, desirably, a long and narrow device. The capacitor 50 is disposed with its longitudinal direction extending along the vehicle width direction. In other words, the longest side of the capacitor 50 extends along the vehicle width direction. The capacitor 50 may include rings 51, 52, 53, and 54 for attachment to hanging hooks. As shown in FIGS. 2 through 4, it would also be possible further to provide a connector 55 upon the upper surface 50a of the capacitor 50. The rings 51, 52, 53, and 54 are positioned lower than the upper surface of the capacitor 50. The rings 51, 52, 53, and 54 are positioned at both the left side and the right side of the capacitor 50. As shown in FIG. 2, the connector 55 is positioned at a portion of the upper surface 50a of the capacitor 50 toward its left rear.

The capacitor 50 is disposed upon the left capacitor support portion 76 and the right capacitor support portion 77. The left capacitor support portion 76 and the right capacitor support portion 77 are both horizontal, and are located in the same plane. As shown in FIGS. 3 through 5, the capacitor 50 is supported by the left capacitor support portion 76 and the right capacitor support portion 77 via elastic members 56, 57, 58, and 59. In other words, the capacitor 50 is elastically supported upon the capacitor support portions. To express this in another manner, the capacitor 50 is elastically supported by the vehicle body frame 2, or by the rear frame 17. Here, these elastic members 56, 57, 58, and 59 may, for example, be dampers.

As shown in FIG. 4, the left capacitor support portion 76 projects more inward (i.e., more towards the right side) as compared with the left inverter support portion 73. Furthermore, the right capacitor support portion 77 projects more inward (i.e., more towards the left side) as compared with the right inverter support portion 74. As a result, as shown in FIG. 2, the rings 51, 52, 53, and 54 can be directly accessed from above. And, as a result, fitting and removal of the capacitor 50 is simple and easy. Moreover, as shown in FIGS. 4 and 5 and so on, the upper surface 50a of the capacitor 50 is positioned lower than the upper edges of the vehicle body frame 2 (in more detail, than the upper edges of the rear frame 17, i.e., of the left member 71 and of the right member 72).

The inverter 40 is positioned above the capacitor 50. To put this in another manner, the capacitor 50 is positioned below the inverter 40. The inverter 40 is installed to be spaced apart by a gap in the vertical direction from the capacitor 50. As a result, as shown in FIG. 1, in a side view, the left side surface of the inverter 40 is overlapped over an opening portion 9w that is provided in the left side surface of the outer cover 9. Although this feature is not shown in the figures, it should be understood that the right side surface of the inverter 40 may be similarly overlapped over an opening portion provided in the right side surface of the outer cover 9 in a side view. Moreover, when the right side surface of the inverter 40 is overlapped over such an opening portion that is provided in the right side surface of the outer cover 9, then the opening portion 9w may not be provided in the left side surface of the outer cover 9.

Like the capacitor 50, the inverter 40 is also a device having the shape of a rectangular parallelepiped. As shown in FIGS. 2 through 5, the shortest side of the inverter 40 extends along the longitudinal direction of the vehicle. Moreover, as shown in FIG. 2, in a top view, the entire inverter 40 is overlaid over the capacitor 50. Accordingly, as shown in FIG. 4, the length of the capacitor 50 in the vehicle width direction is longer than the length of the inverter 40 in the vehicle width direction. Furthermore, as shown in FIG. 5, the length of the capacitor 50 in the longitudinal direction of the vehicle is longer than the length of the inverter 40 in the longitudinal direction of the vehicle. Due to this, the capacitor 50 projects forward in the vehicle as compared to the inverter 40.

Yet further, as shown in FIG. 4, the distance D1 in the vehicle width direction between the left side surface of the left member 71 (i.e., of the rear frame 17 or the vehicle body frame 2) and the left side surface of the inverter 40 is greater than or equal to the distance D2 in the vehicle width direction between the left side surface of the left member 71 (i.e., of the rear frame 17 or the vehicle body frame 2) and the left side surface of the capacitor 50. The distance D3 in the vehicle width direction between the right side surface of the right member 72 (i.e., of the rear frame 17 or the vehicle body frame 2) and the right side surface of the inverter 40 is greater than or equal to the distance D4 in the vehicle width direction between the right side surface of the right member 72 (i.e., of the rear frame 17 or the vehicle body frame 2) and the right side surface of the capacitor 50. As will be clear from FIG. 2, the distance between the left side surface of the outer cover 9 and the left member 71 and the distance between the right side surface of the outer cover 9 and the right member 72 become greater towards the rear of the vehicle. Thus, to compare together a point on the left side surface of the outer cover 9 and a point on the left side surface of the capacitor 50 whose distances in the longitudinal direction of the vehicle from the front of the vehicle are the same, the distance in the vehicle width direction between the left side surface of the outer cover 9 and the left side surface of the inverter 40 is greater than or equal to the distance in the vehicle width direction between the left side surface of the outer cover 9 and the left side surface of the capacitor 50. Moreover, the distance in the vehicle width direction between the right side surface of the outer cover 9 and the right side surface of the inverter 40 is greater than or equal to the distance in the vehicle width direction between the right side surface of the outer cover 9 and the right side surface of the capacitor 50. In other words, at least one of a first side surface of the outer cover 9 that is positioned in the leftwards direction from the left side surface of the inverter 40, and a second side surface of the outer cover 9 that is positioned in the rightwards direction from the right side surface of the inverter 40, is spaced away from the inverter 40 by a gap. Furthermore, the opening portion 9w and the inverter 40 are spaced apart from one another by a gap. Due to this, the entry of air from the opening portion 9w of FIG. 1 into the cooling compartment 22 becomes easier.

Still further, it is yet more desirable for the longest side of the inverter 40 to extend in the vertical direction, as shown in FIG. 4. Due to this, the height A of the inverter 40 becomes longer than its width B. As a result, the distances between the left and right side surfaces of the inverter 40 and the respective left and right side surfaces of the outer cover 9 can be made longer. Due to this, the entry of air from the opening portion 9w of FIG. 1 into the cooling compartment 22 becomes yet easier.

Brackets Supporting the Inverter

Next, brackets that support the inverter 40 will be explained. As shown in FIG. 4, these brackets 60 that support the inverter 40 include a first bracket 61, a second bracket 62, a third bracket 63, and a fourth bracket 64.

The first bracket 61 is supported by the left member 71 and the right member 72, and joins between the left member 71 and the right member 72. Desirably, this first bracket 61 is shaped from a pipe material and has an inverted letter-U shape. In other words, both ends of the first bracket 61 are supported by the vehicle body frame 2, so that the first bracket 61 extends along the vehicle width direction of the work vehicle 1. Referring to FIGS. 2 and 3, the first bracket 61 is disposed behind the inverter 40. However, the interior of the first bracket 61 may not be hollow, and the cross-sectional shape of the first bracket 61 may be polygonal or elliptical.

The first bracket 61 includes a lower left end portion 61a, a first curved portion 61b, a straight line portion 61c, a second curved portion 61d, and a lower right end portion 61e. At its lower end, the lower left end portion 61a has a flange 68 for connection to the elastic member 65. In other words, the elastic member 65 is connected to the lower left end portion 61a. And, at its lower end, the lower right end portion 61e has a flange 69 for connection to the elastic member 66. In other words, the elastic member 66 is connected to the lower right end portion 61e. Desirably, the elastic members 65 and 66 are dampers. The central axes of the elastic members 65 and 66 coincide, respectively, with the central axes of the lower left end portion 61a and of the lower right end portion 61e. The elastic members 65 and 66 are respectively disposed upon the left inverter support portion 73 and upon the right inverter support portion 74.

The left inverter support portion 73 and the right inverter support portion 74 are both horizontal, and are positioned in the same plane. Accordingly, the first bracket 61 is supported upon the left inverter support portion and upon the right inverter support portion 74 via the elastic members 65 and 66. In other words, the first bracket 61 is supported by the inverter support portions 73 and 74 (i.e., by the rear frame 17 or the vehicle body frame 2) via the elastic members 65 and 66. To put this in another manner, the first bracket 61 is elastically supported by the inverter support portions 73 and 74 (i.e., by the rear frame 17 or the vehicle body frame 2).

The first curved portion 61b is connected to the lower left end portion 61a and to the straight line portion 61c. The second curved portion 61d is connected to the lower right end portion 61e and to the straight line portion 61c. The first curved portion 61b and the second curved portion 61d may not be members shaped as circular arcs, but may be angled members shaped in a letter-L form. The straight line portion 61c extends along the vehicle width direction. Accordingly, the longitudinal direction of the first bracket 61 extends along the vehicle width direction.

As shown in FIG. 4, the second bracket 62 extends in the vertical direction. The second bracket 62 is fixed both to the left upper portion of the inverter 40 and also to the left lower portion of the inverter 40. In other words, the second bracket 62 is fixed to the left portion of the inverter 40. A bolt 41 that fixes the second bracket 62 and the left upper portion of the inverter 40 together and a bolt 42 that fixes the second bracket 62 and the left lower portion of the inverter 40 together are shown in FIG. 4. The third bracket 63 extends in the vertical direction. This third bracket 63 is fixed both to the right upper portion of the inverter 40 and also to the right lower portion of the inverter 40. In other words, the third bracket 63 is fixed to the right portion of the inverter 40. A bolt 43 that fixes the third bracket 63 and the right upper portion of the inverter 40 together and a bolt 44 that fixes the third bracket 63 and the right lower portion of the inverter 40 together are shown in FIG. 4. Since the second bracket 62 and the third bracket 63 are left and right symmetric except for a fourth bracket connection portion 63f (refer to FIG. 5), accordingly, in the following, the details of the shapes of the second bracket 62 and the third bracket 63 will be explained with principal attention being focused upon the third bracket 63.

The third bracket 63 comprises a base portion 63a, an upper right attachment portion 63b, a lower right attachment portion 63c, a second bracing portion 63d, a load hanging hook attachment ring 63e, and the fourth bracket connection portion 63f (refer to FIG. 5). As shown in FIG. 5, the base portion 63a extends in the vertical direction from the second bracing portion 63d, and extends in the forward direction when it reaches the vicinities of the upper and lower surfaces of the inverter 40. Moreover, as shown in FIG. 2, the upper right attachment portion 63b extends in the leftwards direction from the vicinity of the front edge of the upper portion of the base portion 63a. The upper right attachment portion 63b may include a female threaded portion for engagement with the bolt 43. When the upper right attachment portion 63b does not include any such female threaded portion for engagement with the bolt 43, then the bolt 43 may be fixed with a nut. As shown in FIG. 4, the lower right attachment portion 63c extends in the leftwards direction from the vicinity of the front edge of the lower portion of the base portion 63a. The lower right attachment portion 63c may include a female threaded portion for engagement with the bolt 44. When the lower right attachment portion 63c does not include any such female threaded portion for engagement with the bolt 44, then the bolt 44 may be fixed with a nut.

The second bracing portion 63*d* is fixed to the straight line portion 61*c* of the first bracket 61. In other words, the second bracing portion 63*d* braces the first bracket 61. Desirably, the second bracing portion 63*d* is fixed to the straight line portion 61*c* by welding. However, the second bracing portion 63*d* may be fixed to the straight line portion 61*c* by some other fixing means, such as a bolt and a nut or the like. In order for the third bracket 63 to support the inverter 40 in a stable manner, it is desirable for the height of the second bracing portion 63*d* to be close to the height of the barycenter of the inverter 40. In other words, it is desirable for the height of the straight line portion 61*c* of the first bracket 61 to be close to the height of the barycenter of the inverter 40. In FIG. 5, the height of the second bracing portion 63*d* (i.e., the height of the straight line portion 61*c* of the first bracket 61) is somewhat lower than the height of the center of the inverter 40 (i.e., than the height of its barycenter).

The ring 63*e* is provided at the upper edge of the base portion 63*a*. In other words, the ring 63*e* is provided to an upper portion of the third bracket 63. As shown in FIG. 5, in the state in which the inverter 40 is attached to the third bracket 63, the ring 63*e* is positioned at the center of the inverter 40 in the longitudinal direction of the vehicle. Due to this, it is possible to lift up the inverter 40 in a stable manner, even when raising the inverter 40 by attaching load hanging hooks to the ring 62*e* of the second bracket 62 and to the ring 63*e* of the third bracket 63, i.e., at only two spots.

The fourth bracket connection portion 63*f* is provided in the vicinity of the center of the bottom of the base portion 63*a* in the longitudinal direction of the vehicle. This fourth bracket connection portion 63*f* may, for example, have a female threaded portion for attachment of a bolt, so as to be attachable to and detachable from the fourth bracket 64.

It should be understood that the second bracket 62 includes a base portion 62*a*, an upper left attachment portion 62*b*, a lower left attachment portion 62*c*, a first bracing portion 62*d*, and a load hanging hook attachment ring 62*e*, respectively corresponding to the base portion 63*a*, the upper right attachment portion 63*b*, the lower right attachment portion 63*c*, the second bracing portion 63*d*, and the load hanging hook attachment ring 63*e*. In other words, the first bracing portion 62*d* braces the first bracket 61. The first bracing portion 62*d* is fixed to the straight line portion 61*c* by welding. Accordingly, the first bracket 61, the second bracket 62, and the third bracket 63 are integrally formed. Moreover, the ring 63*e* is provided at an upper portion of the third bracket 63. It should be understood that the upper left attachment portion 62*b* and the lower left attachment portion 62*c* extend in the opposite vehicle width direction to the upper right attachment portion 63*b* and the lower right attachment portion 63*c*, respectively. Furthermore, the first bracing portion 62*d* is fixed to the straight line portion 61*c* of the first bracket 61 at almost the center of the straight line portion 61*c* in the vehicle width direction. The connector 55 is positioned leftwards of the second bracket 62.

The fourth bracket 64 is fixed to at least one of the second bracket 62 and the third bracket 63. The example described above shows the third bracket 63 has the fourth bracket connection portion 63*f*, and the fourth bracket 64 is fixed to the third bracket 63 thereby. However, the second bracket 62 may have the fourth bracket connection portion 63*f*, alternatively both the second bracket 62 and the third bracket 63 may have fourth bracket connection portions 63*f* and two of the fourth brackets 64 may be provided. In other words, one or two fourth brackets 64 may be attachable to and detachable from either or both of the second bracket 62 and the third bracket 63.

As shown in FIGS. 2 and 5, the fourth bracket 64 extends forwards from the fourth bracket connection portion 63*f*. That is to say, the fourth bracket 64 extends in the longitudinal direction of the vehicle, and is separated from the first bracket 61 by a gap. The fourth bracket 64 has a flange 64*a* at its front end for connection to an elastic member 67. In other words, the elastic member 67 is connected to the front end of the fourth bracket 64. Desirably, the elastic member 67 is a damper. The elastic member 67 is disposed upon the front inverter support portion 75.

As shown in FIG. 5, the front inverter support portion 75 is horizontal, but is positioned lower than the left inverter support portion 73 and the right inverter support portion 74. Moreover, as shown in FIG. 4, the front inverter support portion 75 projects more inwards (i.e. leftwards) as compared to the right inverter support portion 74. However no interference is caused when the capacitor is being installed or removed, since, as shown in FIG. 2, the front inverter support portion 75 is positioned sufficiently more forward than the ring 53.

It should be understood that, from the standpoint of improving the flexibility of arrangement of the various components, it is desirable for the amount of inward projection of the front inverter support portion 75 to be relatively small, and, in the vehicle width direction of the inverter 40, for the fourth bracket 64 to be positioned close to the vehicle body frame 2. In the example shown in FIGS. 2 through 5, the inverter 40 is disposed closer to the right member 72 than to the left member 71. In other words, as shown in FIG. 4, the distance D1 in the vehicle width direction between the inverter 40 and the left member 71 is longer than the distance D3 in the vehicle width direction between the inverter 40 and the right member 72. Accordingly, the fourth bracket 64 is fixed to the third bracket 63 which is on the right side of the inverter 40. In other words, the fourth bracket 64 is positioned on the right side of the inverter 40. It should be understood that, when the distance D3 is longer than the distance D1, then it is desirable for the fourth bracket 64 to be positioned on the left side of the inverter 40.

Due to this, it is possible to dispose components that have no relationship to the components that fix the inverter 40, such as the connector 55 and the power cables 55*a* that connect the inverter 40 to the electric motors 28 and 29 shown in FIG. 3 and so on, at that side among the left side and the right side of the inverter 40 that is remoter from the vehicle body frame (i.e., at the left side of the inverter 40 when the distance D1 is longer than the distance D3, and at the right side of the inverter 40 when the distance D3 is longer than the distance D1).

As described above, the fourth bracket 64 is supported by the front inverter support portion 75 via the elastic member 67. In other words, the fourth bracket 64 is supported by the vehicle body frame 2 via the elastic member 67. On the other hand, the first bracket 61 is supported by the left inverter support portion 73 and the right inverter support portion 74 via the elastic members 65 and 66. Consequently, the brackets 60 and the inverter 40 are elastically supported by the inverter support portions 73, 74, and 75 (i.e., by the rear frame 17 or the vehicle body frame 2). Accordingly, the brackets 60 and the inverter 40 are elastically supported by at least three points of the vehicle body frame 2 (the three points that support the elastic members 65, 66, and 67).

Here, the elastic members 65, 66, and 67 that support the brackets 60 and the inverter 40 and the elastic members 56, 57, 58, and 59 that support the capacitor 50 are completely different. Accordingly, the brackets 60 with the inverter 40, and the capacitor 50, constitute different vibrational systems. Therefore the brackets 60 with the inverter 40, and the capacitor 50, vibrate separately. Nevertheless, as shown in FIG. 4 and so on, since the inverter 40 is installed with a certain separation (gap) in the vertical direction from the capacitor 50, accordingly the brackets 60 with the inverter 40 and the capacitor 50 do not mutually collide.

The Arrangement and the Shape of the Partition Wall

Figure 6:
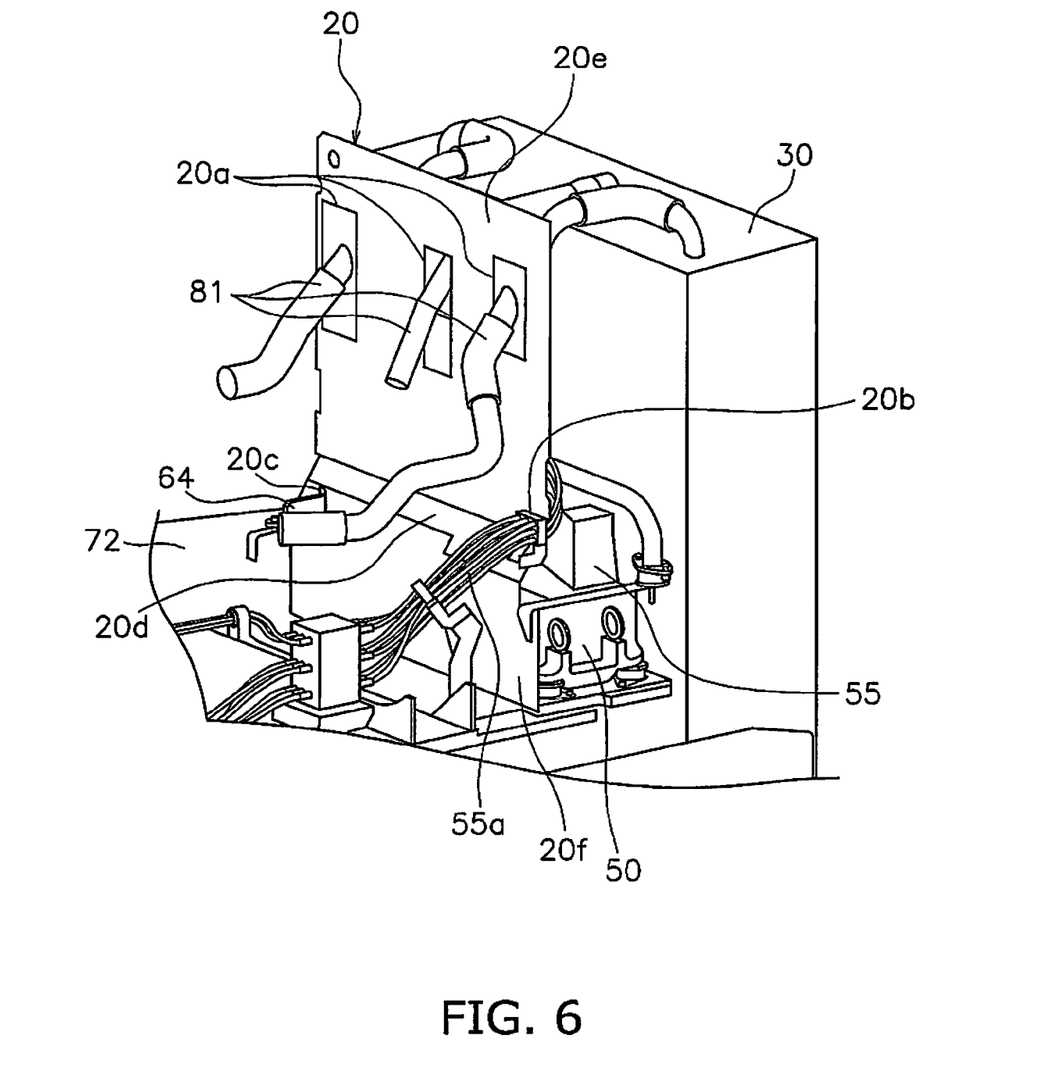
FIG. 6 is a perspective view showing a partition wall as seen slantingly from in front.

FIG. 6 is a perspective view showing the partition wall 20 as viewed slantingly from the front. In FIG. 6, the left member 71, the engine 23, the turbocharger 24, the connection conduit 25, the exhaust processing device 26 and so on are not shown. As shown in FIGS. 3 and 6, the partition wall 20 extends from the vicinity of the upper surface of the outer cover 9 to below the capacitor 50. It should be understood that, in FIG. 3, the upper surface of the outer cover 9 is shown by a double dotted broken line. The partition wall 20 includes through holes 20a for passing conduits 81 of various types that connect components of the engine 23 of various types and the cooling device 30. Moreover, the partition wall 20 includes a through hole 20b for passing the power cables 55a that connect the inverter 40 and the electric motors 28 and 29, and a through hole 20c for passing the fourth bracket 64.

The partition wall 20 has a curved portion 20d that curves forward from below the through hole 20b. As shown in FIG. 3, due to the partition wall 20 having the curved portion 20d, an upper vertical surface 20e of the partition wall 20 can be made to be close to the inverter 40, while a lower vertical surface 20f of the partition wall 20 can be made to be close to the capacitor 50. As a result, it is possible to make the partition wall 20 be close both to the inverter 40 and to the capacitor 50, so that it is possible to make both the capacity of the engine compartment 21 and the capacity of the cooling compartment 22 as small as possible. Accordingly, it is possible to make the vehicle more compact.

Details of the Cooling Device

Figure 7:
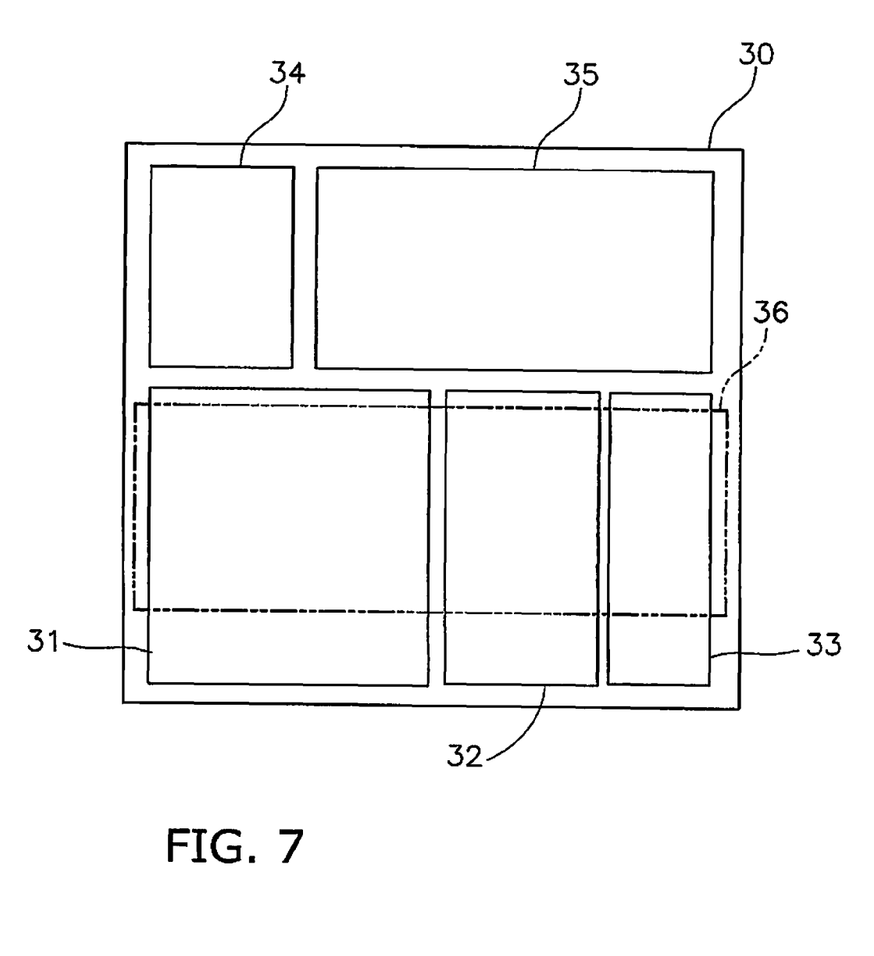
FIG. 7 is a figure showing the general structure of a cooling device.

FIG. 7 is a figure showing the general structure of the cooling device 30. In FIG. 7, a hybrid cooler 36 (the details of which will be described hereinafter) that is positioned more to the front is shown by double dotted broken lines. In order from the lower left, this cooling device 30 includes the radiator 31, an oil cooler 32, and an electric motor cooling device 33. Moreover, from above, the cooling device 30 includes a charge-air cooler (CAC) 34 and an air conditioner condenser 35. The cooling device 30 further includes a hybrid cooler 36 that is disposed in front of the radiator 31, the oil cooler 32, and the electric motor cooling device 33. The radiator 31, the oil cooler 32, and the electric motor cooling device 33 are disposed as arranged along the vehicle width direction. In a similar manner, the CAC 34 and the air conditioner condenser 35 are disposed as arranged along the vehicle width direction. The CAC 34 and the air conditioner condenser 35 are positioned above the radiator 31, the oil cooler 32, and the electric motor cooling device 33.

The oil cooler 32 cools hydraulic fluid that is used by hydraulic pressure devices of various types in the work vehicle 1. The electric motor cooling device 33 cools the refrigerant that takes away the heat generated by the electric motors 28 and 29. The CAC 34 cools the intake of the engine. The air conditioner condenser 35 cools the refrigerant of an air conditioner. The hybrid cooler 36 cools the cooling water of the inverter 40 and of the capacitor 50.

In FIG. 3, the position of the hybrid cooler 36 is shown by a single dotted broken line. As shown in FIG. 3, the hybrid cooler 36 is disposed behind the inverter 40. Moreover, the inverter 40 is spaced apart by a gap from the hybrid cooler 36 in the longitudinal direction of the vehicle. Due to this it is possible to keep high the efficiency by which the inverter 40 and the capacitor 50 are cooled by external air, since the path for passage of air is not hindered by the hybrid cooler 36.

Characteristics

The work vehicle according to this exemplary embodiment has the following distinguishing characteristics.

In the work vehicle 1 the inverter 40, which is shaped as a rectangular parallelepiped, is arranged so that its shortest side extends along the longitudinal direction of the vehicle. By disposing the inverter 40 in this manner, it becomes unnecessary greatly to extend the length of the vehicle in its longitudinal direction. Accordingly, it is possible to mount the inverter in the work vehicle 1 in an efficient manner. Moreover, although the inverter comes to be mounted in an unstable posture, the second bracket 62 and the third bracket 63 are respectively fixed to a left portion and to a right portion of the inverter 40. Furthermore, the first bracket 61 and the fourth bracket 64 to which the second bracket 62 and the third bracket 63 are fixed are supported at least by the inverter support portions 73 through 75 at three spots upon the vehicle body frame. Thus, the inverter 40 is arranged in a stable manner.

The first bracket 61 is a member having an inverted letter-U shape. Since, due to this, the heights of the first bracing portion 62d and of the second bracing portion 63d are close to the height of the barycenter of the inverter 40, accordingly it is possible for the second bracket 62 and the third bracket 63 to support the inverter 40 in a stable manner.

The first bracket 61 is made from a pipe material. Due to this, it is possible to implement lightening of the first bracket 61 while still maintaining the rigidity of the first bracket 61.

When the distance D1 in the vehicle width direction between the inverter 40 and the left member 71 is longer than the distance D3 in the vehicle width direction between the inverter 40 and the right member 72, then the fourth bracket 64 is positioned on the right side of the inverter 40. Alternatively, if the distance D3 is longer than the distance D1, then the fourth bracket 64 is positioned on the left side of the inverter 40. Due to this, it is possible to improve the flexibility for arrangement of the components of the work vehicle 1 by keeping the amount of projection of the front inverter support portion 75 inwards small. Accordingly, it is possible to suppress increase in the size of the work vehicle 1.

The first bracket 61, the second bracket 62, and the third bracket 63 are integrally formed. It facilitates the task of fitting the inverter 40 with the first bracket 61, the second bracket 62, and the third bracket 63. Moreover, the fourth bracket 64 is attachable to and detachable from either of the second bracket 62 and the third bracket 63. Due to this, for example, it is possible to remove the inverter 40 in a simple and easy manner by removing the fourth bracket 64 from the other brackets with the partition wall 20 settled, engaging load hanging hooks into the rings 62e and 63e, and then hoisting the inverter 40 with the second bracket 62 and the third bracket 63 still fitted thereto. Accordingly the tasks of fitting and removing the inverter 40 become simple and easy.

The load hanging hook attachment rings 62e and 63e are provided at the upper portion of the second bracket 62 and at the upper portion of the third bracket 63. Due to this, the tasks of fitting and taking off the inverter 40 become simple and easy, since it is possible to perform the tasks of fitting and taking off the inverter 40 with load hanging hooks.

The central axis of the first elastic member 65 and the central axis of the lower left end portion 61a of the first bracket 61 coincide with one another. Moreover, the central axis of the second elastic member 66 and the central axis of the lower right end portion 61e of the first bracket 61 coincide with one another. Thus, all of the weight imposed upon the lower left end portion 61a is applied to the first elastic member 65, and moreover all of the weight imposed upon the lower right end portion 61e is applied to the second elastic member 66. Accordingly the first bracket 61 is supported by the first elastic member 65 and by the second elastic member 66 in a stable manner.

The front end of the fourth bracket 64 is connected to the third elastic member 67, so that the fourth bracket 64 is supported by the vehicle body frame 2 via the third elastic member 67. Thus, the supporting structure for the inverter 40 becomes extremely resistant to pitching in the longitudinal direction of the vehicle.

The capacitor 50 is provided underneath the inverter 40, and is elastically supported from the vehicle body frame 2 by a vibrational system that is quite different from the vibrational system of the inverter 40. Since both the inverter 40 and the capacitor 50 are heavy units, accordingly, when the inverter 40 and the capacitor 50 were to be supported with a single vibrational system, then vibration of the inverter 40 and the capacitor 50 would tend to become great. Thus, by separating the vibrational systems of the inverter 40 and the capacitor 50, it is possible to reduce the vibration of both of them, so that it becomes possible to lengthen the operational life of them both.

The inverter 40 and the capacitor 50 are arranged as spaced apart in the vertical direction by a gap. As described above, since the vibrational systems of the inverter 40 and the capacitor 50 are different, accordingly the inverter 40 and the capacitor 50 vibrate separately. By arranging the inverter 40 and the capacitor 50 as spaced apart in the vertical direction by a gap, it is possible to prevent mutual collision between the inverter 40 and the capacitor 50, so that it becomes possible to lengthen the operational life of them both.

In a top view, the entire inverter 40 is overlapped over the capacitor 50. Due to this, the inverter 40 does not project to the left or to the right from the capacitor 50. Accordingly, it is possible to dispose the inverter 40 and the capacitor 50 in a compact manner, so that it is possible to suppress increase in the size of the vehicle body.

Variant Embodiments

While an exemplary embodiment of the present invention has been explained above, the present invention is not to be considered as being limited to this exemplary embodiment; various alterations are possible provided that the gist of the present invention is preserved.

In the exemplary embodiment described above, the explanation centered upon an example in which the inverter 40 was disposed close to the right member 72. However, the inverter 40 may be disposed close to the left member 71. In this case, desirably, the fourth bracket 64 would be fixed to the second bracket 62, and it would be desirable for the support portion 75 to project inward (i.e., rightwards) from the inner side surface of the left member 71. Moreover, it would be desirable for the connector 55 and the power cables 55a to be disposed to the right side of the third bracket 63.

It would also be possible for a pump that circulates water between the hybrid cooler 36, the inverter 40, and the capacitor 50 to be provided in some appropriate position. In this case, it would be desirable for the pump to be provided in the vicinity of a position more to the front than the connector 55 upon the capacitor 50.

The number and the position of attachment components, such as bolts and so on, explained in the exemplary embodiment described above may be varied as appropriate. Moreover, the shapes of the first bracket 61, the second bracket 62, the third bracket 63, and the fourth bracket 64 may be different from those described. The inverter 40 and the capacitor 50 need not be precise rectangular parallelepipeds; for example, their angles could be rounded off, and their sides except the angles might be more or less irregular. Moreover, the inverter 40 may be cubical.

While, in the exemplary embodiment described above, a case was explained in which the first bracket 61 was formed from a pipe material, the first bracket 61 could also be a member of some other type. For example, the first bracket 61 could be made from steel channel, angle iron (steel) or H-section steel stock.

According to the present invention, it is possible to provide a hybrid work vehicle in which an inverter and so on can be mounted in an efficient manner.

The invention claimed is:

1. A work vehicle in which a driving force is generated by an engine and by an electric motor, comprising:
    a vehicle body frame;
    an inverter having a rectangular parallelepiped shape;
    a first bracket extending along a vehicle width direction of the work vehicle;
    a second bracket fixed to a left part of the inverter, the second bracket extending vertically;
    a third bracket fixed to a right part of the inverter, the third bracket extending vertically; and
    a fourth bracket fixed to one of the second bracket and the third bracket, the fourth bracket extending in a longitudinal direction of the work vehicle in a direction away from the first bracket, the fourth bracket being supported by the vehicle body frame;
    the second bracket being fixed to the first bracket;
    the third bracket being fixed to the first bracket;
    both ends of the first bracket being supported by the vehicle body frame; and
    a shortest side of the inverter extending along the longitudinal direction of the work vehicle.

2. The work vehicle according to claim 1, wherein the first bracket is an inverted U-shaped member made from a pipe material.

3. The work vehicle according to claim 2, further comprising
    a first elastic member connected to a lower left end portion of the first bracket; and
    a second elastic member connected to a lower right end portion of the first bracket;
    a central axis of the first elastic member coinciding with a central axis of the lower left end portion of the first bracket;

a central axis of the second elastic member coinciding with a central axis of the lower right end portion of the first bracket; and the first bracket being supported by the vehicle body frame via the first elastic member and the second elastic member.

4. The work vehicle according to claim 3, wherein a third elastic member is connected to the front end of the fourth bracket; and the fourth bracket is supported by the vehicle body frame via the third elastic member.

5. The work vehicle according to claim 4, further comprising a capacitor elastically supported by the vehicle body frame below the inverter, the vibrational system of the capacitor being different from the vibrational system of the inverter.

6. The work vehicle according to claim 5, wherein the inverter and the capacitor are separated from one another in the vertical direction by a gap.

7. The work vehicle according to claim 5, wherein in a top view, the entirety of the inverter is overlapped over the capacitor.

8. The work vehicle according to claim 7, wherein the vehicle body frame includes a left member and a right member;

when a first distance in the vehicle width direction between the inverter and the left member is longer than a second distance in the vehicle width direction between the inverter and the right member, the fourth bracket is positioned on the right side of the inverter; and when the second distance is longer than the first distance, the fourth bracket is positioned on the left side of the inverter.

9. The work vehicle according to claim 8, wherein when the first distance in the vehicle width direction between the inverter and the left member is longer than the second distance in the vehicle width direction between the inverter and the right member, a power cable connecting the inverter and the electric motor is disposed on the left side of the inverter; and when the second distance is longer than the first distance, the power cable is disposed on the right side of the inverter.

10. The work vehicle according to claim 9, wherein the first bracket, the second bracket, and the third bracket are integrally formed, and the fourth bracket is attachable to and detachable from either of the second bracket and the third bracket.

11. The work vehicle according to claim 1, wherein the vehicle body frame includes a left member and a right member;

when a first distance in the vehicle width direction between the inverter and the left member is longer than a second distance in the vehicle width direction between the inverter and the right member, the fourth bracket is positioned on the right side of the inverter; and when the second distance is longer than the first distance, the fourth bracket is positioned on the left side of the inverter.

12. The work vehicle according to claim 11, wherein when the first distance in the vehicle width direction between the inverter and the left member is longer than the second distance in the vehicle width direction between the inverter and the right member, a power cable connecting the inverter and the electric motor is disposed on the left side of the inverter; and when the second distance is longer than the first distance, the power cable is disposed on the right side of the inverter.

13. The work vehicle according to claim 1, wherein the first bracket, the second bracket, and the third bracket are integrally formed, and the fourth bracket is attachable to and detachable from either of the second bracket and the third bracket.

14. The work vehicle according to claim 1, further comprising an additional fourth bracket fixed to the other of the second bracket and the third bracket.

* * * * *